United States Patent
Yehezkely et al.

(10) Patent No.: US 10,972,110 B2
(45) Date of Patent: Apr. 6, 2021

(54) LOCAL OSCILLATOR FREQUENCY-BASED PROXIMITY SENSOR

(71) Applicant: Wiliot, LTD., Caesarea (IL)

(72) Inventors: Alon Yehezkely, Haifa (IL); Nir Shapira, Raanana (IL)

(73) Assignee: Wiliot, LTD., Caesarea (IL)

( * ) Notice: Subject to any disclaimer, the term of this patent is extended or adjusted under 35 U.S.C. 154(b) by 0 days.

(21) Appl. No.: 16/744,860

(22) Filed: Jan. 16, 2020

(65) Prior Publication Data
US 2020/0228124 A1 Jul. 16, 2020

Related U.S. Application Data

(60) Provisional application No. 62/793,265, filed on Jan. 16, 2019.

(51) Int. Cl.
| | |
|---|---|
| *H03L 7/099* | (2006.01) |
| *H04B 1/04* | (2006.01) |
| *G06F 1/3206* | (2019.01) |
| *H02J 50/80* | (2016.01) |
| *G01B 7/14* | (2006.01) |
| *H02J 50/20* | (2016.01) |
| *H02J 50/00* | (2016.01) |

(52) U.S. Cl.
CPC ............... *H03L 7/099* (2013.01); *G01B 7/14* (2013.01); *G06F 1/3206* (2013.01); *H02J 50/001* (2020.01); *H02J 50/20* (2016.02); *H02J 50/80* (2016.02); *H04B 1/04* (2013.01); *H03B 2200/006* (2013.01); *H03B 2201/0225* (2013.01)

(58) Field of Classification Search
CPC .. H03L 7/099; H04B 1/04; H02J 50/80; H02J 50/20; H02J 50/001; H03B 2200/006; H03B 2201/0225
USPC ..... 331/167, 117 FE, 74; 340/505, 530, 500, 340/539.23, 539.26, 552; 455/121, 120
See application file for complete search history.

(56) References Cited

U.S. PATENT DOCUMENTS

| | | | |
|---|---|---|---|
| 9,497,572 B2 | 11/2016 | Britt et al. | |
| 2013/0130843 A1* | 5/2013 | Burroughs | ............... G01S 13/82 473/415 |
| 2015/0200447 A1 | 7/2015 | Tang et al. | |

(Continued)

FOREIGN PATENT DOCUMENTS

| | | |
|---|---|---|
| EP | 2566281 A1 | 3/2013 |
| WO | 2017074757 A1 | 5/2017 |

OTHER PUBLICATIONS

Low frequency Doubler in Cellulose Based Materials for Harmonic RFID applications, Palazzi et al, IEEE Microwave and Wireless Components Letters, vol. 24, No. 12, Dec. 2014 (Year: 2014).*

(Continued)

*Primary Examiner* — Arnold M Kinkead
(74) *Attorney, Agent, or Firm* — M&B IP Analysts, LLC.

(57) ABSTRACT

A local oscillator frequency-based proximity sensor is disclosed. The proximity sensor includes: an integrated circuit having at least a capacitive element; and an antenna designed with an inductive element; wherein the capacitive element and the inductive element form a proximity sensor oscillating at a local oscillator (LO) frequency, wherein the integrated circuit is configured to measure a frequency offset from the LO frequency, wherein the frequency offset is indicative of a detection of a nearby object.

23 Claims, 10 Drawing Sheets

(56) References Cited

U.S. PATENT DOCUMENTS

| | | |
|---|---|---|
| 2015/0372371 A1 | 12/2015 | Lagnado et al. |
| 2016/0006476 A1* | 1/2016 | El-Rayis .................. H04B 1/18 455/78 |
| 2016/0182096 A1* | 6/2016 | Panioukov ........... H04B 17/102 343/861 |
| 2016/0259932 A1 | 9/2016 | Lakshmanan et al. |
| 2016/0276738 A1 | 9/2016 | Chen et al. |
| 2017/0160416 A1 | 6/2017 | Juan et al. |

OTHER PUBLICATIONS

International Search Report and Written Opinion of International Searching Authority for PCT/US2020/013867, ISA/ RU, Moscow, Russia, dated: Apr. 22, 2020.

* cited by examiner

LOCAL OSCILLATOR FREQUENCY-BASED PROXIMITY SENSOR

CROSS-REFERENCE TO RELATED APPLICATIONS

This application claims the benefit of U.S. Provisional Application No. 62/793,265 filed on Jan. 16, 2019, the contents of which are hereby incorporated by reference.

TECHNICAL FIELD

The present disclosure relates generally to oscillators, and more specifically to detecting environmental changes such as motion or proximity using a local oscillator frequency measurement.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect data and transmit such data to a central controller. This data can include, among other examples, motion or proximity data detected from the immediate surroundings. There are a few requirements to be met to allow widespread deployment of IoT devices. Such requirements include reliable communication links, low energy consumption, and low maintenance costs.

Many versions of proximity sensors are commercially available and disclosed in the related art. FIG. 1A illustrates a schematic diagram of one example of a standard infrared (IR) based proximity sensor 100. The sensor 100 includes two resistors 122 and 124, where a first resistor 122 has a resistance of ~250 ohms, and the second resistor 124 has a resistance of ~10K ohms. A power supply 150 provides around 5 volts of power, and the sensor circuit is completed with an output 160 and a ground 110. An IR source 130 and a photodiode 140 are placed in parallel, where the IR source 130 emits an IR beam that can be detected by the photodiode 140. In an embodiment, both the IR source 130 and the photodiode 140 are light emitting diodes (LEDs), and are configured as a transmitter/receiver pair. When a reflection of the emitted beam off of a nearby object is detected by the photodiode, the intercepted IR beam decreases the resistance of the photodiode, and a resulting electrical signal is generated, which can be output at 160 as a signal indicating the detection of an object within a predetermined proximity.

As another example, as shown in FIG. 1B, a proximity sensor may be based on capacitive properties. The sensor 170 includes a DC supply 171 and DC output 172, where the DC supply 171 provides power to an oscillator 173 to charge a capacitor. The capacitor is made up of two plates, however only a single capacitor plate 175 is present within the sensor 170. A circuit within the capacitive proximity sensor uses the supplied DC power 171 to generate AC, to measure the current in the internal AC circuit, and to switch the output circuit when the amount of AC current changes. The AC can move current into and out of the internal capacitor plate 175 only if there is another plate 177 nearby that can hold the opposite charge. A target that is close enough to be detected acts as the other plate. If this target, e.g., an external plate 177, is close enough to the sensor 170 to be affected by the charge in the sensor's internal capacitor plate 175 through an air gap 176 acting as a dielectric interface, it will respond by becoming oppositely charged near the sensor 170, and the sensor 170 will then be able to move significant current into and out of its internal plate. A current sensor 174 is used to determine the change of current and the proximity of the nearby object.

Yet another example of a proximity sensor is an inductive sensor 180, shown in FIG. 1C. A high-frequency magnetic field 183 is generated by a coil 182 connected to an oscillation circuit 181. When a target 184 approaches the magnetic field 183, an induction current (eddy current) flows in the target 184 due to electromagnetic induction. As the target 184 approaches the sensor 180, the induction current flow increases, which causes the load on the oscillation circuit 181 to increase. Then, oscillation attenuates or stops. The sensor 180 detects this change in the oscillation status, e.g., with an amplitude detecting circuit, and outputs a detection signal.

While other variations of proximity sensors exist, each require a separate power source to provide the voltage necessary to detect near object proximity. Additionally, capacitive and induction-based sensors are often limited to the detection of only metallic or ferrous objects, without the capability to detect movement of nonmetallic items, or movement of the sensor itself.

Although the circuits discussed above relate to proximity sensors, similar restrictions exist for motion sensors as well. The necessity of an independent power source is limiting for devices designed for low-power use, such as IoT devices, and the restriction of detecting only metallic objects is too limiting for many IoT applications.

Certain IoT devices are designed to support low power communication protocols, such as Bluetooth low energy (BLE), LoRa, and the like. However, IoT devices utilizing such protocols require an external power source, such as a coin battery. The reliance on a power source is a limiting factor for electronic devices, due to, for example, cost, size, lack of durability to environmental effects, and frequent replacement. Additionally, relying on external power sources such as batteries requires larger space allotment, often presenting difficulties for IoT devices designed for the minimal dimensions possible.

As an alternative to using batteries, power may be harvested from environmental sources such as light, movement, and electromagnetic power including existing radio frequency transmissions. Such minimal power must be effectively managed to implement various sensors, including a proximity sensor, a motion sensor, and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a local oscillator frequency-based proximity sensor, including: an integrated circuit having at least a capacitive element; and an antenna designed with an inductive element; wherein the capacitive element and the inductive element form a proximity sensor oscillating at a local oscillator (LO) frequency, wherein the integrated circuit is configured to measure a frequency offset from the LO frequency, wherein the frequency offset is indicative of a detection of a nearby object.

Certain embodiments disclosed herein also include a battery-less Internet of things (IoT) tag integrated with a proximity sensor, including: a transmit antenna designed to have an inductive element; and an integrated circuit having a capacitive element; wherein the inductive element and the capacitive element form the proximity sensor oscillating at a local oscillator (LO) frequency, and wherein a frequency offset from the LO frequency is indicative of a detection of a nearby object.

Certain embodiments disclosed herein also include a method for detecting a proximity of a nearby object, including: determining a local oscillator (LO) frequency of a proximity sensor; measuring a current oscillating frequency of the proximity sensor; determining a frequency offset between the LO frequency and the current oscillating frequency during a measurement window; and determining if the frequency offset exceeds a predetermined threshold, wherein the frequency offset exceeding the predetermined threshold is indicative of at least a detection of a nearby object.

Certain embodiments disclosed herein also include a local oscillator frequency-based proximity sensor, including: an antenna designed to have an inductive element; and an integrated circuit having a capacitive element; wherein the inductive element and the capacitive element form the proximity sensor oscillating at a local oscillator (LO) frequency, wherein the integrated circuit is configured to measure a current oscillating frequency of the proximity sensor, and wherein a frequency offset from the LO frequency is indicative of a detection of a nearby object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
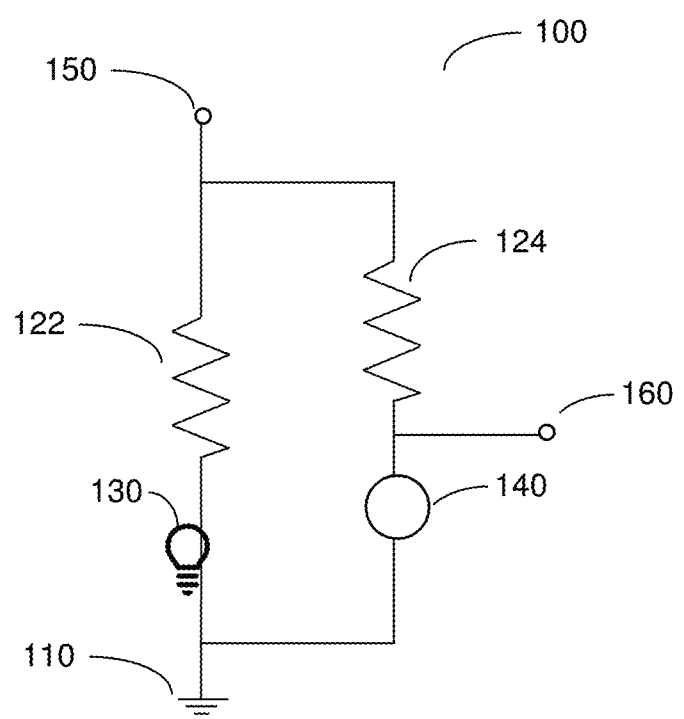
FIG. 1A is a schematic diagram of an IR proximity sensor.
Figure 1B:
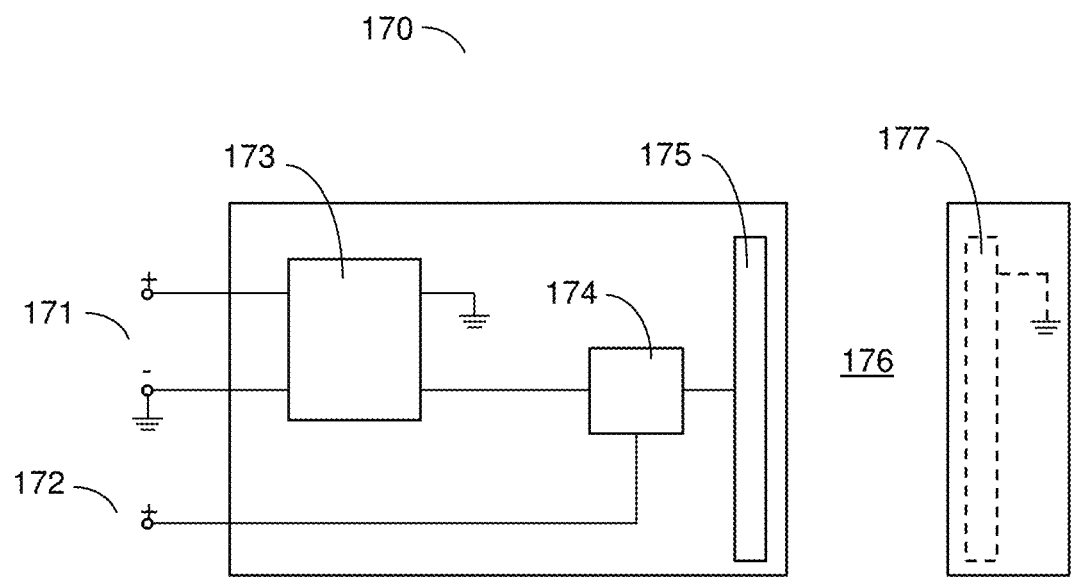
FIG. 1B is a schematic diagram of a capacitance proximity sensor.
Figure 1C:
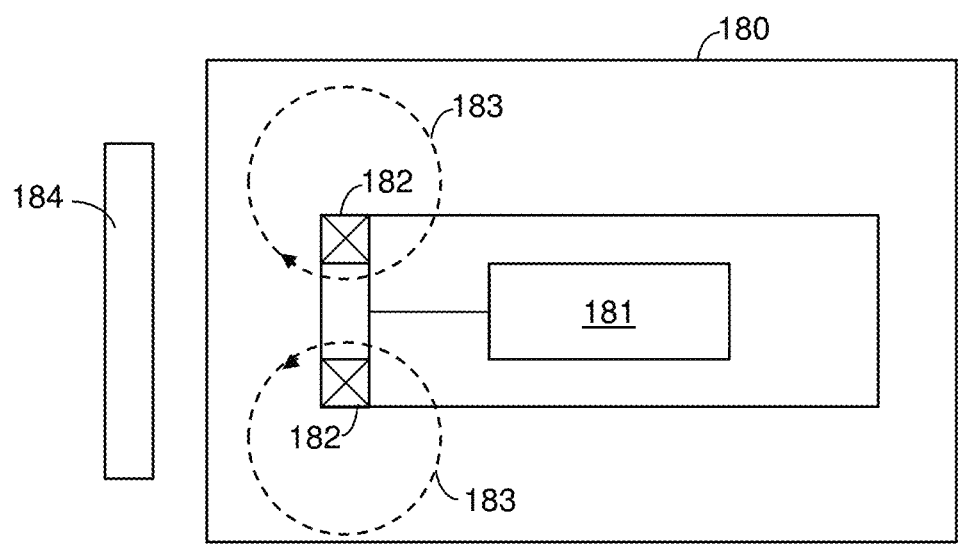
FIG. 1C is a schematic diagram of an inductive proximity sensor.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining motion or proximity based on shifts in oscillator frequency of a local oscillator of an IoT tag, and specifically a battery-less IoT tag.

Figure 2:
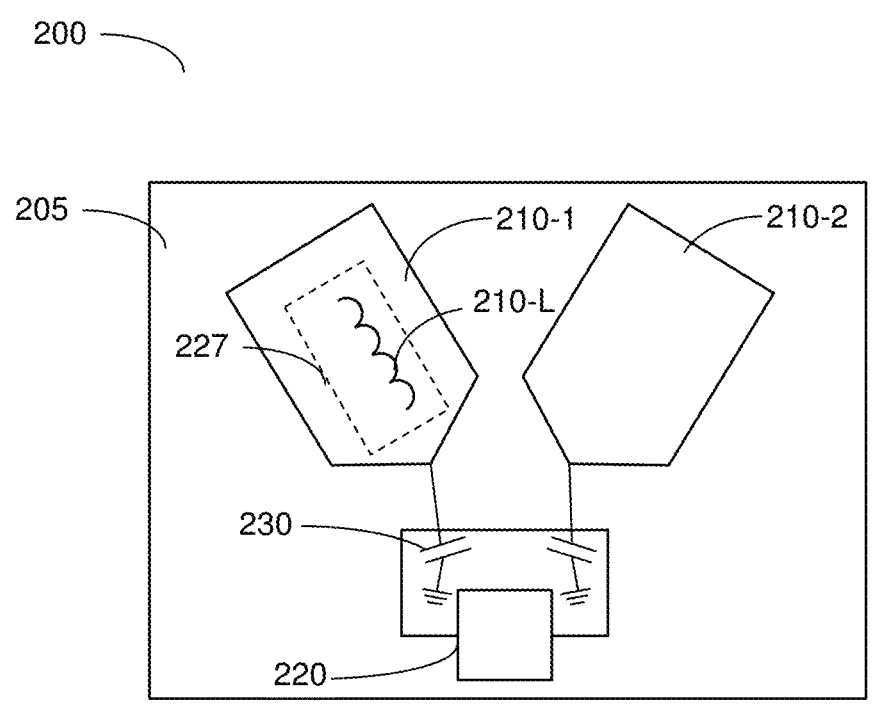
FIG. 2 is a schematic diagram of an IoT tag with a proximity sensor according to an embodiment.

FIG. 2 is a schematic diagram of an IoT tag 200 providing proximity and motion detection according to an embodiment. In an embodiment, the IoT tag 200 includes an integrated circuit (IC, or chip) 220 and at least one antenna 210-1, 210-2 placed on an inlay 205. In an embodiment, the inlay 205 is a single layer inlay that includes the integrated circuit 220 connected to the at least one antenna 210-1, 210-2 and may be mounted on a substrate (not shown). The substrate is a single layer material, which may be a single metal layer or any appropriate integrated circuit mounting material, such as a printed circuit board (PCB), silicon, flexible printed circuits (FPC), low temperature co-fired ceramic (LTCC), polyethylene terephthalate (PET), paper, and the like.

In an example embodiment, the IoT tag 200 includes a pair of antennas 210-1 and 210-2 that are etched within the inlay 205. The first antenna 210-1 is utilized to harvest energy from ambient signals and the second antenna 210-2 is utilized to transmit signals, such as BLE signals. Each antenna 210-1, 210-2 may be of a type including a loop antenna, a big loop with two feeds, a dipole antenna with two transformer feeds, and similar configurations. It should be noted that the transmit antenna 210-2 may be utilized to harvest energy as well. Further, in some configurations, a plurality of antennas may be utilized to harvest energy, each of which is designed to receive signals at a different frequency domain.

Each antenna 210-1, 210-2 is structured to have an impedance-matching structure to generate the required impedance (marked as '210-L') at the integrated circuit interface at the desired operating frequency. It should be emphasized that the inductive element 210-L is not a dedicated inductor, but rather the interface-to-antenna impedance featuring an inductance quality, as typically is required because of the integrated circuit interface which is of a capacitive nature. The inductive element 210-L is illustrated as an inductor merely for the sake of the discussion.

In an embodiment, at least the first antenna 210-1 is connected to a capacitive element 230. The capacitive element 230 can be a capacitor included within the integrated circuit 220. In another embodiment, the capacitive element 230 is realized as the integrated capacitance or parasitic capacitance of various circuits (not shown) included in the integrated circuit 220. The parasitic capacitance may be present at the connection between the antenna 210-1 and the integrated circuit 220, where the capacitive element 230 is located between an antenna feed line and ground. Parasitic capacitance is an unavoidable capacitance that exists between the parts of an electronic component or circuit due to their proximity to each other. In yet another embodiment, the capacitive element 230 may be a capacitive interface impedance of the integrated circuit 220.

A disclosed proximity sensor 227 providing motion and proximity sensing properties of the IoT tag 200 is realized by the inductive element 210-L and the capacitive element 230. These elements form the proximity sensor 227 oscillating at a certain frequency, which depends on the environment. The oscillating frequency remains substantially constant when there is no environmental interference or force acting on the proximity sensor. It should be noted that there is no absolute resonant frequency for the sensor 227 and its oscillating frequency depends on the environment. Hereinafter a local oscillator (LO) frequency is defined as the last measured (or known) oscillating frequency of the proximity sensor 227.

The sensor 227 of the shown embodiment utilizes the inductance provided by the inductive element 210-L from the first antenna 210-1. Because the inductive element 210-L is external, the inductance is affected by slight electromagnetic changes in the environment, e.g., the movement or proximity of nearby objects or surfaces. Thus, every change of inductance due to environmental effects causes a frequency offset from the LO frequency of the sensor 227. Such an offset is indicative of a detection of the presence of a nearby object, motion of a nearby object, motion of the IoT tag 200 itself, or other activity in the area of the IoT tag 200.

In an embodiment, the LO frequency and any offset therefrom can be measured internally by the integrated circuit 220. As such, the measured frequency can be sampled and monitored over time. Changes in this frequency can be determined to indicate events of pickup, movement, proximity detection of external objects or persons, and the like. In an embodiment, the offset may also be determined by an external analytic system as discussed in greater detail below.

The integrated circuit 220, in an embodiment, provides the functionality of a wireless IoT device or tag 200. The integrated circuit 220 includes a number of execution functions realized as analog circuits, digital circuits, or both. For example, the integrated circuit 220 can perform functions, such as reading from and writing to memory, e.g., of peripherals, executing simple logic operations; tracking power levels; generating and preparing data packets for transmission; cyclic redundancy check (CRC) code generation; packet whitening; encrypting/decrypting and authenticating packets; converting data from parallel to serial; and staging the packet bits to the analog transmitter path for transmission.

In an embodiment, the integrated circuit 220 includes a frequency measurement circuit (not shown in FIG. 2) that is coupled to the sensor 227 and configured to measure the LO frequency and/or current oscillating frequency of the sensor 227. Various embodiments for measuring the LO frequency are discussed below. The measurements, in an embodiment, result in a digital frequency word indicative of any motion or proximity detection.

In an embodiment, the LO frequency can be measured, or referenced, relative to a second oscillator (not shown) connected to the integrated circuit 220. The referenced oscillator (e.g., an auxiliary oscillator) can be pre-calibrated to a certain frequency. The calibration of such oscillator may be performed using over-the-air signals as discussed, for example, in U.S. patent application Ser. No. 15/994,388, now pending and assigned to the common assignee, which is hereby incorporated by reference. In another embodiment, the reference signals may be non-calibrated, in which case it is known to typically produce frequencies within a certain range. In both cases, relative frequency changes over time can be detected by the integrated circuit 220.

Because the inductive element 210-L is integrated within the antenna 210-1 and is external to the integrated circuit 220, the inductive element 210-L is sensitive to pulling or locking effects from external signals. Such effects distort the frequency measurement results. Therefore, in an embodiment, a Clear Channel Assessment (CCA) process is performed before activating the frequency measurements. CCA is a process used to listen for RF transmission over a channel to determine if the channel is being used or if it is available for transmission. Any detected signal energy on the channel is compared with a predetermined CCA parameter value to establish if the channel is available for use. Additionally, outlier measurements that are determined to have resulted from external interference are removed.

In an embodiment, the IoT tag 200 is battery-less and powered by harvested energy, e.g., collected via the antennas 210-1 and 210-2. Thus, the IoT tag 200 may not be able to perform processing tasks that require energy, such as the above mentioned CCA process, outlier detection, and the generation of pickup or movement events. To this end, in an embodiment, the IoT tag 200 is connected to an analytic system configured to perform the processes of at least a CCA, an outlier detection, and the generation of pickup or movement events. The deployment of the analytic system can be performed in a gateway and/or a cloud-computing platform as further illustrated in FIG. 8.

In some embodiments, the transmission of the frequency measurements is performed using a separate transmission antenna, e.g., 210-2, that is also affected by the environment. In some embodiments, the harvesting antenna, e.g., 210-1, is additionally used for both transmission and sensing. In the latter case, an antenna tuning circuit (not shown) to be able to control the transmission frequency. Since the transmission antenna 210-2 can also be sensitive to the environment, in an embodiment the IoT tag 200 is configured such that the transmission flow involves dynamic calibration of a tuning setting to maintain a certain frequency required for the transmission of signals.

During a pickup event, the oscillating frequency of the sensor 227 changes, as shown below in FIGS. 4 and 5. Since calibration incurs latency, and also requires charging of the capacitor, transmission may fail during the pickup event itself, as the transmission will be done in a non-calibrated frequency. Thus, in an embodiment, the frequency measurements are transmitted several times to ensure a high probability of being successfully received by a receiving device. In such an embodiment, the frequency measurements may include a local timestamp of the time the measurement was performed rather than the time it is transmitted. In an embodiment, the determination of accurate frequency measurement data and related timestamps is performed by an external analytic system.

Figure 3A:
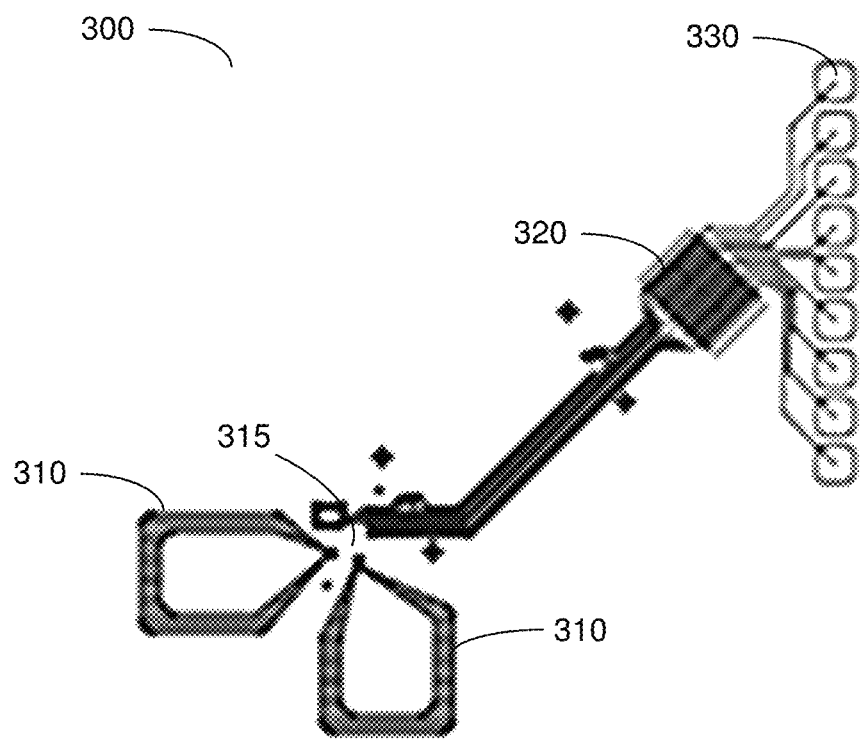
FIGS. 3A-3D are diagrams of IoT tags according to various embodiments.

FIGS. 3A-3D are example diagrams of IoT tags 300 according to various embodiments. FIG. 3A shows a first embodiment of an IoT tag 300 that includes two loop antennas 310 that are connected to an integrated circuit, or chip, (not shown, but which is placed at the vertices 315 of the antennas later during production). As shown, the antennas 310 are connected to test connector pads 320 and 330, which may be removed later during production. The loop antennas 310 feature an inductive impedance at the interface of the antenna, as discussed above in FIG. 2, and a capacitor (not shown), either as an independent component of the IoT tag 300, or as part of the chip placed at 315 (not shown), as discussed above in FIG. 2.

Figure 3B:
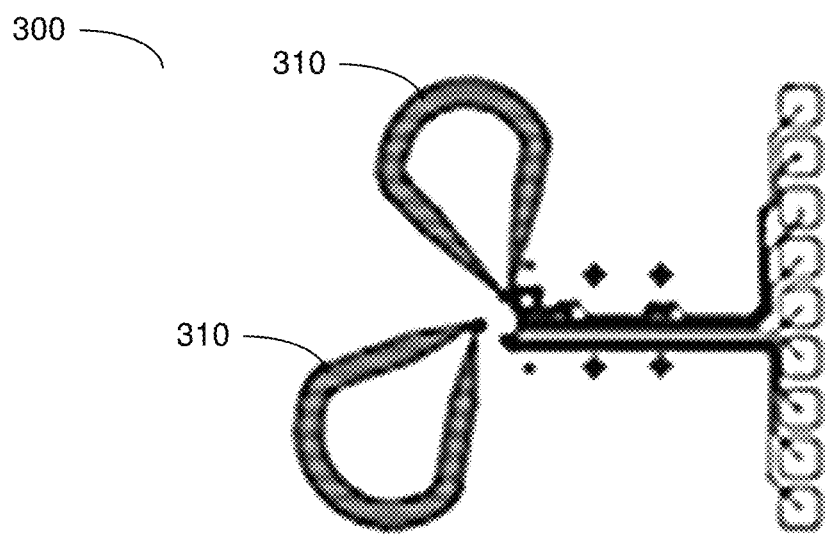
Figure 3C:
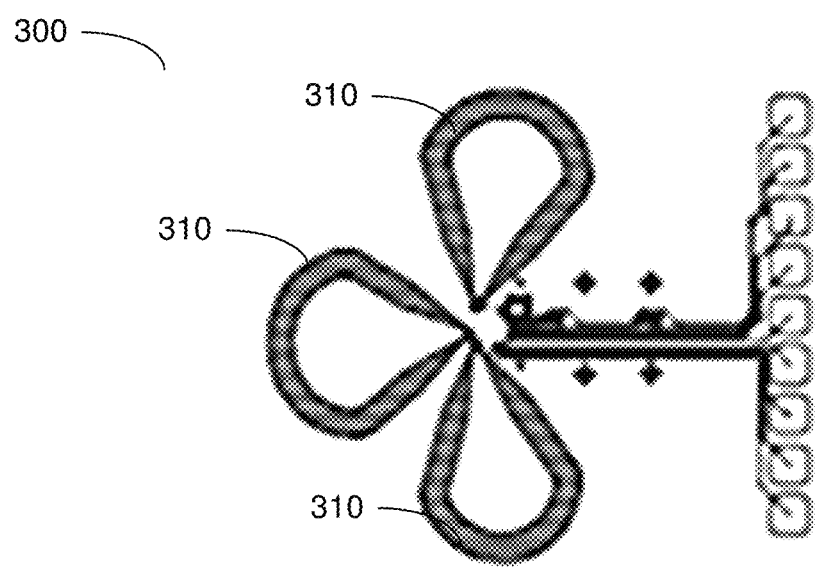
Figure 3D:
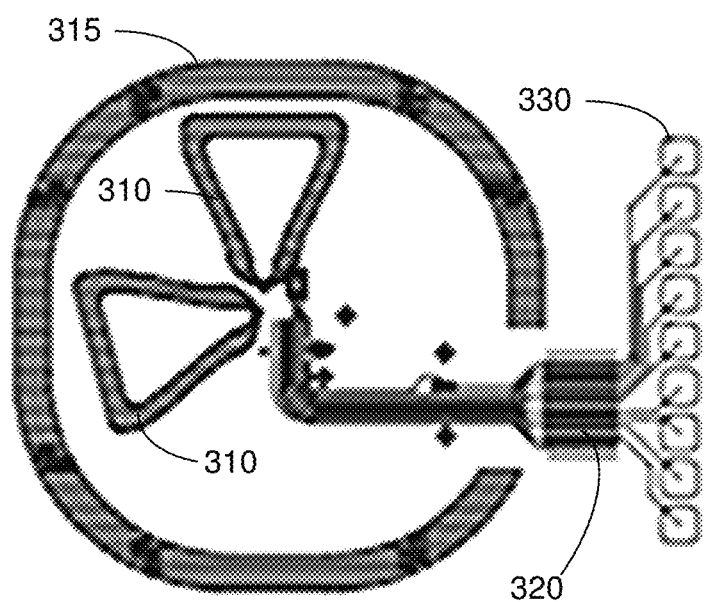

FIGS. 3B and 3C show two embodiments of an IoT tag 300 having two and three rounded loop antennas 310, which are further connected to an integrated circuit (not shown). FIG. 3D includes two triangular shaped loop antennas 310 surrounded by a circular antenna 315, each connected to an integrated circuit (not shown).

Figure 4:
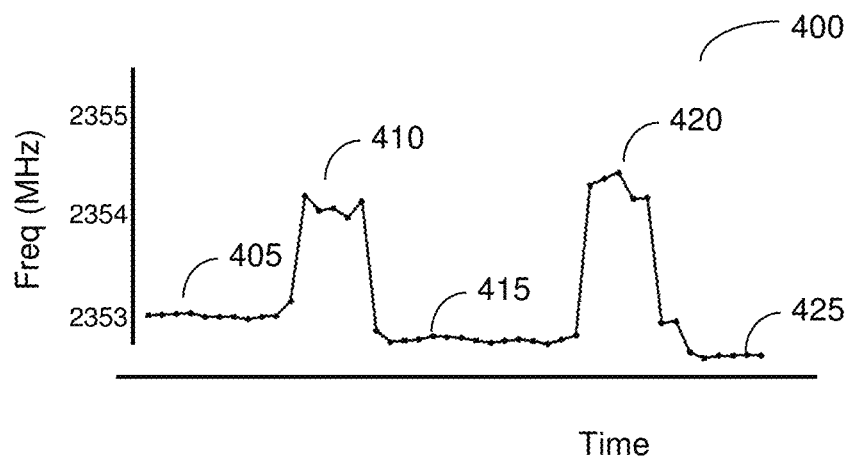
FIG. 4 is a graph of a time series of measurements of the LO frequency of an IoT tag according to an embodiment.
Figure 5:
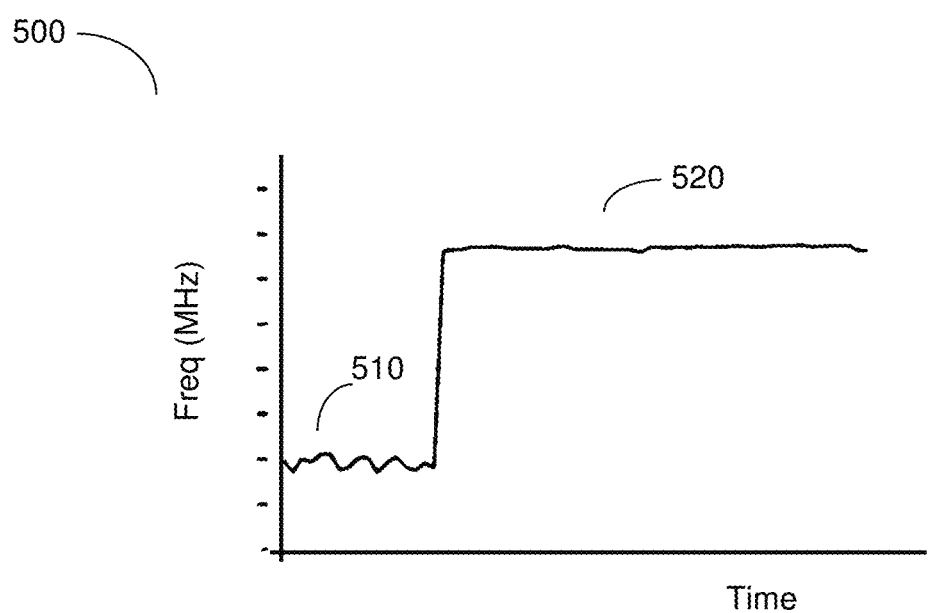
FIG. 5 is a graph of the impact of removing a bottle of liquid that was standing on an IoT tag.

FIG. 4 shows an example graph 400 of a time series of measurements of the oscillating frequency of the proximity sensor (227) included in an IoT tag, according to an embodiment. In the shown example, the initial LO frequency 405 is approximately 2353 MHz. Two pickup events 410 and 420 can be clearly identified, i.e., events where the IoT tag itself has been picked up. During these two events, the oscillating frequency changes by approximately 1 MHz to 1.5 MHz. These changes are due to the inductance changes of the antenna from the proximity of a person's hand to the antenna while being moved. Therefore, as can be determined from the above example, proximity event is determined based on the offset from an LO frequency and one or more consecutive measurements of a current oscillating frequency. It should be noted that when the sensor 227 is stabilized around a new oscillating frequency (e.g., due to a new environment), such a frequency is set as the (new) LO frequency.

As can be determined from the time series, the oscillating frequency not only changes during the pickup event 410 and 420, but it can be noticed that the frequency before and after each pickup event has slightly changed as well. Note that the initial LO frequency 405 before the first pickup event 410 is higher than the post-pickup frequency 415. A similar shift can be seen between the pre-pickup 415 and post-pickup 425 frequencies relative to the second pickup event 420. These changes are attributed to the fact that the IoT tag has been put-down with a slight orientation change relative to its initial position before the pickup.

In the shown example, the oscillating frequency has decreased by approximately 400 kHz after the first pickup 410, and a further 100 kHz after the second pickup 420. Thus, even if a measurement did not take place during the first pickup event itself, e.g., due to lack of energy in the case of a harvesting based device discussed above, the movement of the tag can be detected post-pickup. Such sensitive detection can be achieved with either sufficiently high resolution from the IoT tag itself, or with additional processing and averaging of multiple IoT tags together using a cloud-based system, discusses further below, since the delta-offset in the shown example is below the resolution of the IoT tag.

In some cases, however, the LO frequency changes relative to current oscillating frequencies can be significant. FIG. 5 shows a graph 500 of the impact of removing a bottle of liquid that had been placed on an IoT tag. An oscillating frequency after 520 the bottle is removed from the IoT tag is around 100 MHz higher than the measured initial LO frequency 510 before the removal.

Figure 6:
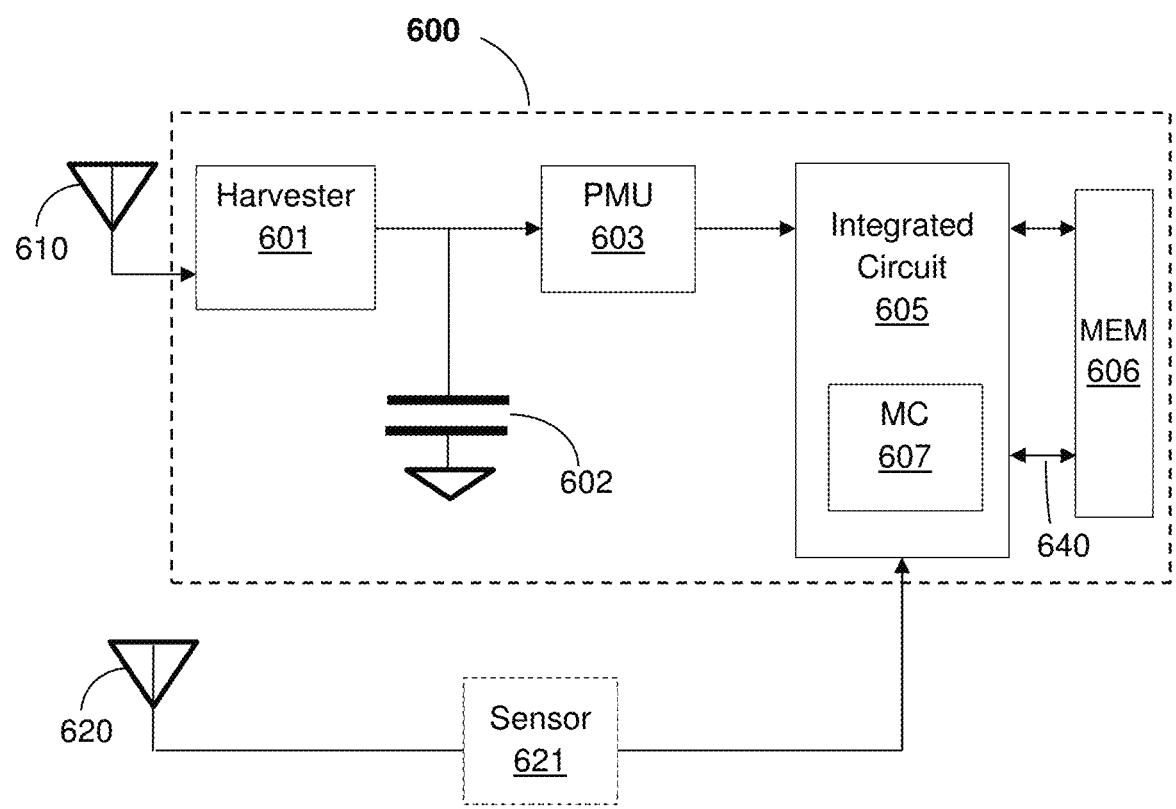
FIG. 6 is an example schematic diagram of an IoT tag according to an embodiment.

FIG. 6 is an example schematic diagram of an IoT tag 600 according to an embodiment. In the shown embodiment, the IoT tag 600 includes an energy harvester 601, coupled to a capacitor 602, such as an on-die capacitor, a power management unit (PMU) 603, an integrated circuit 605, and a retention memory 606. The IoT tag 600 further may include at least one harvesting antenna 610 and a transmit antenna 620. In an embodiment, one or both of the antennas 610 and 620 are printed on or etched into a substrate on which the IoT tag 600 is disposed on. The harvesting antenna 610 is coupled to the harvester 601 and is utilized for energy harvesting, and the transmit antenna 620 is used for wireless communication to transmit frequency data of the IoT tag 600. In an embodiment, the IoT tag 600 does not include any external DC power source, such as a battery.

In an embodiment, the integrated circuit 605 implements electronic circuits (such as, memory, logic, RF, and the like) to perform various functions allowing communication using a low energy (power) communication protocol. Examples for such a protocol includes, but are not limited to, Bluetooth®, LoRa, Wi-Fi®, nRF, DECT®, Zigbee®, Z-Wave, EnOcean, and the like. In one embodiment, the integrated circuit 605 operates using a Bluetooth low energy (BLE) communication protocol.

The harvester 601 is configured to provide multiple voltage levels to the integrated circuit 605, while maintaining a low loading DC dissipation value. In an example implementation, the energy harvester 601 may include a voltage multiplier (not shown) coupled to the harvesting antenna 610. The voltage multiplier may be a series connection of the DC outputs of multiple AC rectifying circuits, where all the AC inputs are connected together to the antenna. The transmit antenna 620 is configured as a receive/transmit antenna of the integrated circuit 605.

The PMU 603 is coupled to the capacitor 602 and is configured to regulate the power to the integrated circuit 605. Specifically, as the capacitance of the capacitor 602 is very limited, the power consumption should be carefully maintained. This maintenance is performed to avoid draining of the capacitor 602, thus resetting the integrated circuit 605.

In another embodiment, the PMU 603 may be further configured to provide multi-level voltage level indications to the integrated circuit 605. Such indications allow the integrated circuit 605 to determine the state of a voltage supply at any given moment when the capacitor 602 charges or discharges. According to this embodiment, the PMU 603 may include a detection circuitry controlled by a controller. The detection circuitry includes different voltage reference threshold detectors, where only a subset of such detectors is active at a given time to perform the detection.

The IoT tag 600 does not include a crystal oscillator to provide a reference clock signal. Rather, according to an embodiment, the reference clock signal used by the IoT tag 600 is generated using over-the-air signals received from the transmit antenna 620.

The retention memory 606 is a centralized area in the system IoT tag 600 that is constantly powered. Data to be retained during low power states is located in the retention memory 606. In an embodiment, the retention area is optimized to subthreshold or near threshold voltage, e.g., 0.3V-0.4V. This allows for the reduction of the leakage of the retention cells and allows the extension of a retention time by allowing the capacitor voltage to drop to lower levels without losing data.

In an embodiment, the integrated circuit 605 further includes a measurement circuitry 607 configured to measure and LO and current oscillating frequencies of proximity sensor 621 (and hence tag 600). Specifically, the measurement circuitry 607 is configured to perform repetitive measurements of the current oscillating frequencies and determine a frequency offset of the sensor 621 over time.

In an embodiment, the frequency measurements are performed, by the circuitry 607, using a reference oscillator (not shown), calibrated to a certain frequency, in the IoT tag 600. Such a reference oscillator can generate corresponding measurement windows. Measuring the LO frequency and/or current oscillating frequencies during this window is accomplished by counting the number of oscillator signal zero crosses that occur within the window. In an example embodiment, each frequency measurement may be a digital frequency word 640 that being stored in the retention memory 606.

In an example embodiment, the reference oscillator is calibrated to 2.4 GHz which is the reference frequency is derived from an oscillator. A measurement window can be derived from the reference oscillator, e.g., with lengths of 1 μs, 16 μs, 64 μs, and the like. The longer the duration of the measurement window, the better its resolution. In a 1 μs window, the resolution of the frequency measurement is 1 MHz (2400 zero crosses for 2.4 GHz reference frequency, 2401 zero crosses for 2.401 GHz reference frequency, and the like). With a 64 μs measurement window, the resolution is ~15 kHz.

While a longer measurement window allows for better measurement resolution, the required energy for performing the measurement increases proportionally to the duration of the measurement window. Thus, energy harvesting based on an IoT tag, such as the IoT tag 600, at a given harvesting range, has a limited length of measurement the tag can perform.

In an embodiment, the IoT tag 600 is configured to measure using a time window length directly correlated to the available energy of the capacitor 602, and upload the measurements to an analytic system, e.g., in a cloud-computing platform. The measurements uploaded to an external analytic system can be further analyzed to determine any motion or proximity events.

For example, a number of subsequence measurements can be correlated to each other or averaged either to remove outliers or cancel noises. Measurements that are different from each other, e.g., beyond a predetermined threshold, can be indicative of motion or proximity changes in the vicinity of the IoT tag 600. As a simple example, if a series frequency measurement reads '0000' and a new frequency measurement reads '0FFF', then it can be determined that the frequency has likely been changed due to movement around the IoT. The determination if the frequency has changed due to motion or movement near the IoT tag can be performed by the analytic system.

In an embodiment, the transmit antenna 620 is connected to the integrated circuit 605 via the proximity sensor 621 configured to detect frequency changes. It should be noted that the proximity sensor 621 need not be a dedicated sensor, but rather a mechanism to detect motion or proximity based on changes in oscillating frequency relative to a current LO frequency due to motion or proximity changes near the IoT tag 600. The proximity sensor 621 is illustrated as a separate element merely for the sake of the discussion.

In an example IoT tag 600, measurements, as well as transmissions of the measured data, take place only when there is a predetermined threshold of harvested energy for transmission. As such, it is expected that during energy harvesting the sensor measurements from the LO cannot be taken. Assuming each measurement drains the available energy at the capacitor 602, the periods between measurements are related to the charge time of the capacitor or battery of the IoT tag 600, and depends on the availability, duty-cycle, and strength of the energizing signal.

In an example embodiment, the charge time of the capacitor 602 is in the order of seconds. In this case, the IoT tag 600 may miss short term events such as a pickup event. Thus, the IoT tag 600 is "blind" during harvesting operation. Additionally, transmission requires energy, such that if each measurement is to be transmitted separately, an additional latency, or "blind" interval, will be experienced during the charge time for the transmit operation. In an embodiment, the IoT tag 600 is configured to store data in the retention memory 640. Such data may include relevant frequency changes related to a predetermined number of events, and only then transmit a group of data, e.g., to a cloud-based system.

When frequency offset values are measured relative to a reference oscillator, as noted above, the measurements are impacted from changes and variability of the reference. The reference oscillator stability can be impacted from various temperature changes and phase noise (PN) introduced to the measurement. Using the analytic system, PN can be averaged using longer measurements and/or averaging consecutive measurements. The analytic system can additionally compensate certain factors, such as the impact of temperature, e.g., by retrieving data of a temperature sensor and applying appropriate corrections to the measurements.

In an embodiment, the reference oscillator is configured to have minimal impact from the environment compared to the free-running frequency. For example, the reference oscillator can be implemented as an internal ring oscillator, an internal LC oscillator where the inductor L is internal to the chip and hence not impacted from the environment, or an LC oscillator with an external inductor that is not designed as an antenna, and is therefore relatively minimally impacted from electro-magnetic changes in the environment. It should be noted that an external inductor can have a better quality-factor than an internal inductor, and therefore consumes less power than an LC oscillator with internal inductor.

It should be further noted that the reference oscillator can be either dynamically calibrated by itself, or free running. When the reference oscillator is not calibrated, the reference oscillator's operating range is known. In either case, differential changes in frequency measurement can be accurately detected.

Figure 7:
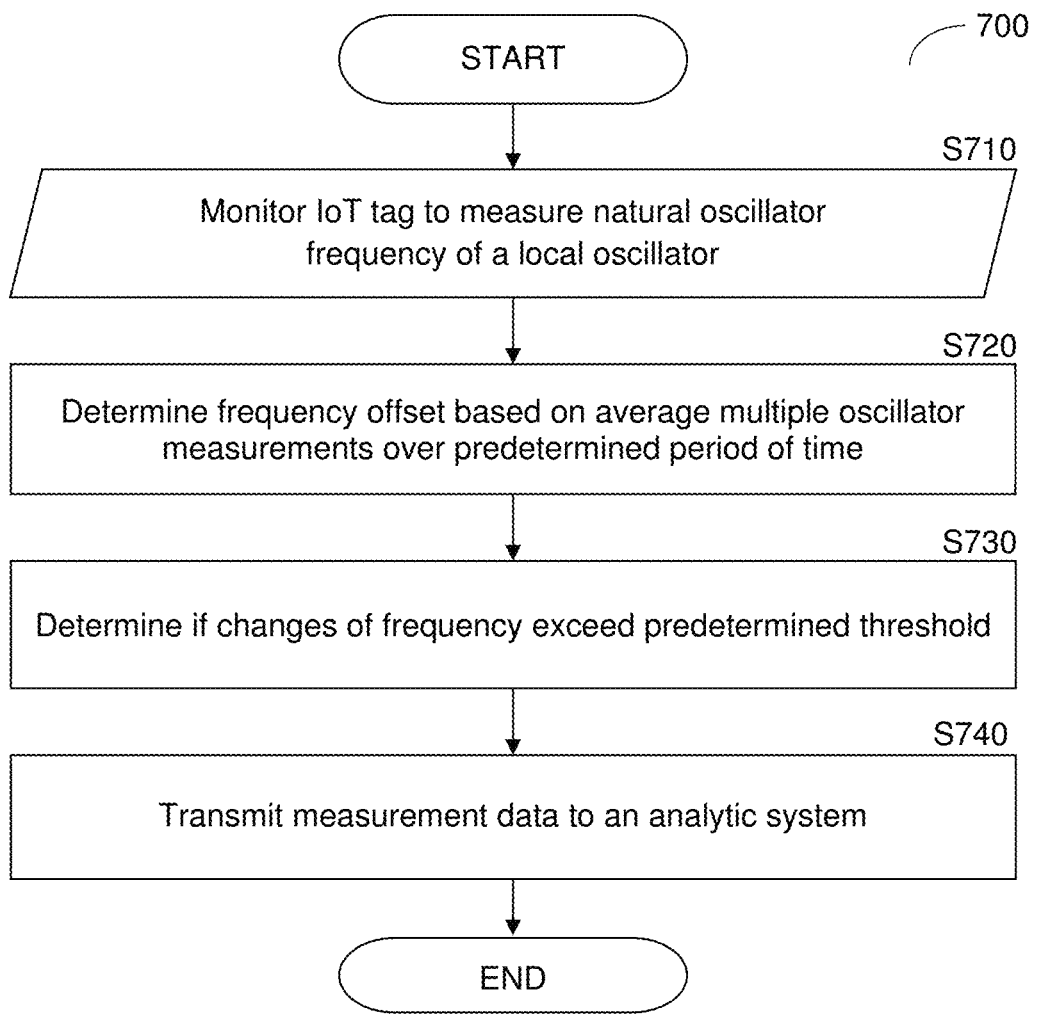
FIG. 7 is a flowchart illustrating a method for detecting movement or proximity based on local oscillator frequency measurement according to an embodiment.

FIG. 7 is an example flowchart 700 illustrating a method for detecting movement or proximity using a proximity sensor, e.g., of an IoT tag, according to an embodiment. The proximity sensor is structured as discussed above.

At S710, an LO frequency is measured. The LO frequency is a function of an inductive element 210-L and a capacitive element 230 (both shown in FIG. 2). The LO frequency depends on the environment and remains substantially constant when there is no environmental interference or force acting on the proximity sensor. Every change of inductance due to the environment causes a frequency offset from the LO frequency. The measurement produces frequency measurement data, which may be stored in a retention memory.

At S720, one or more consecutive measurements of the current oscillating frequency of the sensor are preformed over a measurement window. In an embodiment, the measurements are averaged as at least one of a mean, a median, a standard deviation, and similar calculations of average frequency values. The average measurement can be determined based on a set period of time, e.g., average of frequencies measured over 1 second, based on the number of measurements taken, e.g., after ten measurements are taken, and the like. When the IoT tag is powered by harvested energy, the number of measurements may be based on available power, and thus the time period over which ten measurements are made can vary depending on the stored and available power to the IoT tag.

At S730, a frequency offset between the LO frequency and the consecutive measurements, as well as if such an offset exceeds a predetermined threshold, is determined. The threshold can be static, or dynamic and based on environmental parameters. For example, the threshold may be adjusted based on a determined current operating temperature of the IoT tag.

At S740, in an embodiment, the frequency measurement data is transmitted to an external analytic system which is an external to the IoT tag. In one embodiment, every measurement is transmitted to the external analytic system. While this ensures accurate data, it requires additional energy which may not always be available. In a further embodiment, only the calculated average measurements are transmitted. In yet a further embodiment, only measurements that have been determined to exceed the predetermined threshold are transmitted to the external analytic system. The latter two embodiments require less power than the first embodiment for transmission, but introduce a delay in data transmitted to the cloud-based system. In yet a further embodiment, the number of transmissions is adjustable based on available power. In a further embodiment, all LO frequency measurements are sent to the analytic system and the determination of a frequency offset and pickup/proximity events are determined by the analytic system.

In some embodiments, the transmission of the frequency measurements is performed using a transmit antenna that is also affected by the environment when the antenna is configured to utilize an external inductor to increase the Q factor and save current. In some embodiments, the same LO and antenna are used for both transmitting and sensing. In the latter case, the LO has an antenna tuning circuit configured to control the transmission frequency. In this case, the tuning setting should be set to a specific consistent value during measurement. This can be different from the tuning value used for transmission. The value should be consistent to allow the cloud-based system to accurately compare measurements. In some cases, oscillator measurements are performed using different tuning frequencies, e.g., when one frequency has a lot of external interference. In these cases, the IoT tag should transmit to the cloud-based system not only the LO measurement value, but also the antenna tuning setting that was used during the measurement.

As the transmission antenna is also sensitive to the environment, the transmission flow usually involves dynamic calibration of the tuning setting to maintain a certain frequency. During a pickup event, the frequency changes quickly, as shown in FIGS. 4 and 5. Since calibration incurs latency, and also requires charging of the capacitor, transmission may fail during the pickup event itself, as the transmission will be performed in a non-calibrated frequency. Thus, in an embodiment the measurement data is transmitted several times to ensure it has a high probability of being successfully received. In such an embodiment, the frequency measurements include a local timestamp of the time the measurement was done rather than the time it is transmitted.

Figure 8:
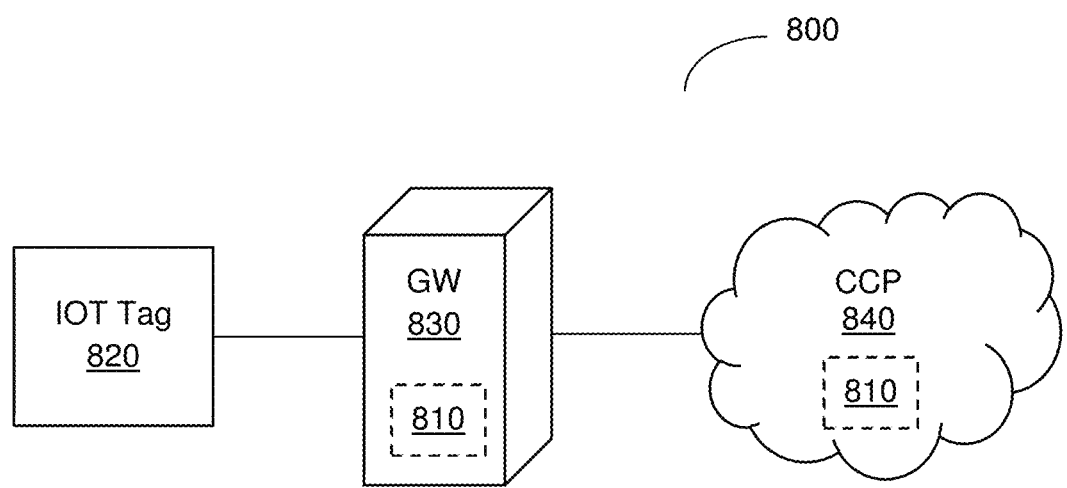
FIG. 8 is a network diagram showing the deployment of the analytic system according to an embodiment

FIG. 8 is a network diagram 800 illustrating the deployment of an analytic system 810 according to an embodiment. As illustrated in FIG. 8, an IoT tag 820 is connected to a gateway 830, which is further connected to a cloud-computing platform 840. The gateway 830 is a device configured to connected to both the IoT tag 820, e.g., over a BLE connection, and to the cloud-computing platform 840, e.g., over a Wi-Fi or ethernet connection. The IoT tag 820 operates as discussed in greater detail above.

The analytic system 810 may be installed in the gateway 830 or integrated in the cloud-computing platform 840. Because the IoT tag 820 is a passive device which scavenges energy from ambient sources and is configured to operate with minimal power requirements, any analytics performed on the data collected by the IoT tag 820, including the analysis of frequency changes and deviations, can be offloaded to the analytic system 810.

In an embodiment, the gateway 830 is configured to perform an energy-c (not shown), where measurements of frequencies and changes thereto can be transmitted to a cloud-based analytic system 810. The analytic system 810 is configured to analyze the time series of the frequency measurements.

In an embodiment, the IoT tag 820 is powered on and off depending on the energy conditions. Such a tag cannot robustly track the measurement time series independently due to power requirements, but remains useful when coupled with a gateway 830 or cloud-based platform 840. Another advantage of an analytic system 810 external to the IoT tag 800 itself is that the analytic system 810 can be configured to receive data points from multiple IoT tags. In an embodiment, the cloud-computing platform 840 is configured to analyze data of many co-located tags together to determine common conclusions regarding the surrounding environment. In a case where the measurements are noisy, the cloud-computing platform 840 can additionally average and filter out the noise.

The gateway 830 may be any computing device, such as a smartphone, a tablet computer, a personal computer, a router, and the like.

Based on the received data, the analytic system 810 can perform various forms of analytics, compensate drifts, and do noise filtering/averages to be able to detect either pickup or movement effects. In an embodiment, the analytic system 810 is configured to receive measurement data of multiple tags, and in particular co-located tags. In some cases, the analytic system determines which tags are co-located from prior information, or from receiving the data from the same gateway (typically the range of a gateway from the tags is limited to a few meters).

In an embodiment, the analytic system 810 is configured to deduce co-location from correlating measurement data from different IoT tags. In an embodiment where the energy source of the IoT tags is not static, the analytic system 810, deployed in the cloud-computing platform 840, is configured to detect when a number of tags become energized together.

In an embodiment, transmission of data is based on a power source that is also responsible for a pickup event. As an example, a person carrying a smartphone used as a harvested power source approaches multiple tags. The tags become energized together and begin transmitting to the cloud-based system. When the person moves closer to the tags, the LO frequency of each tag is affected. If a single tag is picked up by the person, the frequency of that tag changes more relative to the other tags. When the person puts down the tag and starts to move away, the frequency value post put-down is slightly different from before pickup, since tag orientation will likely have changed, as discussed above in FIG. 4. For the remainder of the tags, the frequency post put-down has not changed. As the person continues to move away, all tags will cease transmission as they run out of energy. Each of these sequences of events can be transmitted and analyzed by the analytic system 810 from the frequency measurement data. In an embodiment, the analytic system 810 is configured to consider the available per-tag test data from different stages of the tag's history.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A local oscillator frequency-based proximity sensor, comprising:
    an integrated circuit having at least a capacitive element;
    an antenna designed with an inductive element; and
    an inlay, wherein the integrated circuit and the antenna are etched within the inlay;
    wherein the capacitive element and the inductive element form a proximity sensor oscillating at a local oscillator (LO) frequency, wherein the integrated circuit is configured to measure a frequency offset from the LO frequency, wherein the frequency offset is indicative of a detection of a nearby object.

2. The proximity sensor of claim 1, wherein the inductive element is at least an inductive interface impedance, and wherein the antenna is structured to have an impedance-matching structure to generate a required inductance for the LO frequency.

3. The proximity sensor of claim 1, wherein the LO frequency remains substantially constant when there is no environmental interference acting on the proximity sensor, and wherein the LO frequency is a last measured oscillating frequency of the proximity sensor.

4. The proximity sensor of claim 1, wherein the capacitive element is any one of: a capacitive interface impedance, a dedicated capacitor coupled to the integrated circuit, and a parasitic capacitance of one or more circuits included in the integrated circuit.

5. The proximity sensor of claim 1, wherein the frequency offset is a digital word, and wherein the digital word is transmitted through the antenna to an external analytic system.

6. The proximity sensor of claim 1, wherein the integrated circuit is further configured to:
    measure the frequency offset during a measurement window based on the LO frequency and one or more consecutive measurements of a current oscillating frequency of the proximity sensor.

7. The proximity sensor of claim 1, wherein the integrated circuit is further configured to measure the frequency offset using a reference oscillator.

8. The proximity sensor of claim 1, wherein the frequency offset is additionally indicative of at least one of: motion of the nearby object, motion of the proximity sensor, and proximity of the nearby object.

9. A battery-less Internet of things (IoT) tag integrated with a proximity sensor, comprising:
    a transmit antenna designed to have an inductive element; and
    an integrated circuit having a capacitive element;
    a harvesting antenna connected to a harvester, wherein the harvester is configured to harvest energy from ambient signals; and
    an energy storage for storing the harvested energy;
    wherein the inductive element and the capacitive element form the proximity sensor oscillating at a local oscillator (LO) frequency, and wherein a frequency offset from the LO frequency is indicative of a detection of a nearby object.

10. The battery-less IoT tag of claim 9, wherein the harvesting antenna, the transmit antenna, and the integrated circuit are disposed within a single layer inlay.

11. The battery-less IoT tag of claim 9, wherein the integrated circuit is further configured to:
    measure the frequency offset during a measurement window based on the LO frequency and one or more consecutive measurements of a current oscillating frequency of the proximity sensor.

12. The battery-less IoT tag of claim 9, wherein the battery-less IoT tag further comprises:
    a reference oscillator, and wherein the integrated circuit is further configured to measure at least a current oscillating frequency using the reference oscillator.

13. The battery-less IoT tag of claim 9, wherein inductive element is at least an inductive interface impedance, and wherein the transmit antenna is structured to have an impedance-matching structure to generate a required inductance for the LO frequency.

14. The battery-less IoT tag of claim 13, wherein the LO frequency remains substantially constant when there is no environmental interference acting on the proximity sensor, wherein the LO frequency is a last measured oscillating frequency of the proximity sensor.

15. The battery-less IoT tag of claim 9, wherein the capacitive element is any one of: a capacitive interface impedance, a dedicated capacitor coupled to the integrated circuit, and a parasitic capacitance of one or more circuits included in the integrated circuit.

16. The battery-less IoT tag of claim 9, wherein the integrated circuit is further configured to:
  determine a digital word corresponding to a current measured oscillating frequency of the proximity sensor; and
  transmit the digital word to an external analytic system through the transmit antenna.

17. The battery-less IoT tag of claim 16, wherein the frequency offset is determined by the external analytic system based on the LO frequency and one or more consecutive measurements of a current oscillating frequency of the proximity sensor.

18. The battery-less IoT tag of claim 9, wherein the frequency offset is additionally indicative of at least one of: motion of the nearby object, motion of the proximity sensor, and proximity of the nearby object.

19. A local oscillator frequency-based proximity sensor, comprising:
  an antenna designed to have an inductive element;
  an integrated circuit having a capacitive element;
  determine a digital word corresponding to the measured current oscillating frequency; and
  transmit the digital word to an external analytic system through the antenna, wherein the frequency offset is determined by the external analytic system;
  wherein the inductive element and the capacitive element form the proximity sensor oscillating at a local oscillator (LO) frequency, wherein the integrated circuit is configured to measure a current oscillating frequency of the proximity sensor, and wherein a frequency offset from the LO frequency is indicative of a detection of a nearby object.

20. The proximity sensor of claim 19, wherein the frequency offset is determined by the external analytic system based on the LO frequency and one or more consecutive measurements of the current oscillating frequency of the proximity sensor.

21. The proximity sensor of claim 19, wherein the LO frequency remains substantially constant when there is no environmental interference acting on the proximity sensor, wherein the LO frequency is a last measured oscillating frequency of the proximity sensor.

22. The proximity sensor of claim 19, wherein the LO frequency has a free-running frequency depending on an environmental interference acting on the proximity sensor.

23. The proximity sensor of claim 19, wherein the capacitive element is any one of: a capacitive interface impedance, a dedicated capacitor coupled to the integrated circuit, and a parasitic capacitance of one or more circuits included in the integrated circuit.

\* \* \* \* \*